United States Patent [19]
Kennedy

[11] Patent Number: 5,643,128
[45] Date of Patent: Jul. 1, 1997

[54] HARMONIC DRIVE USING GUIDED, FLOATING CAM DRIVEN CYLINDERS AS POWER TRANSMITTING ELEMENTS

[75] Inventor: Othar P. Kennedy, Colorado Springs, Colo.

[73] Assignee: AMI Industries, Colorado Springs, Colo.

[21] Appl. No.: 595,230

[22] Filed: Feb. 1, 1996

[51] Int. Cl.$^6$ .................................................. F16H 13/08
[52] U.S. Cl. ........................ 475/168; 297/361.1; 297/362; 297/408; 297/463.1
[58] Field of Search ................ 475/168; 297/361.1, 297/362, 408, 463.1

[56] References Cited

U.S. PATENT DOCUMENTS

| | | | |
|---|---|---|---|
| 1,444,717 | 2/1923 | Webb | 475/168 |
| 1,735,616 | 11/1929 | Morison | 475/168 |

FOREIGN PATENT DOCUMENTS

| | | | |
|---|---|---|---|
| 354350 | 1/1970 | Germany | 475/168 |
| 1199257 | 7/1970 | United Kingdom | 475/168 |

*Primary Examiner*—Charles A. Marmor
*Assistant Examiner*—Nathan O. Jensen
*Attorney, Agent, or Firm*—William J. Kubida; Richard A. Bachand; Holland & Hart LLP

[57] ABSTRACT

A device for rotating a first structure relative to a second structure has a rotatable shaft for attachment to the first structure. A first cylinder is coaxially attached to the rotatable shaft, and has a plurality of bearing constraining apertures for holding a plurality of bearings. A hollow fixed member for attachment to the second structure has a coaxially attached second cylinder outside of the first cylinder. The second cylinder has a plurality of bearing seats on its inside wall for selectively receiving the bearings. The number of bearing constraining apertures is different from the number of bearing seats, so that the bearings are harmonically aligned by the constraining apertures to be movable to within the bearing seats only at selected progressive locations. A handle is coaxially and rotatably mounted to the fixed member, and carries a cam inside the first and second cylinders. The cam has a protruding cam face in one location to sequentially engage the bearings to urge the engaged bearings into bearing seats with which they align. The cam also has a recessed cam face in another location that allows the bearings to move laterally with movement of the first cylinder without engaging the bearing seats in nonaligned locations. Thus, when the handle is rotated with respect to the fixed member, the bearings engaged by the cam are progressively forced sequentially within the bearing constraining apertures into the tapered bearing seats of the second cylinder to move the first and second cylinders relative to each other.

26 Claims, 5 Drawing Sheets

HARMONIC DRIVE USING GUIDED, FLOATING CAM DRIVEN CYLINDERS AS POWER TRANSMITTING ELEMENTS

BACKGROUND OF THE INVENTION

1. Field of the Invention

This invention relates to improvements in rotating drive mechanisms or devices, and more particularly to improvements in rotating harmonic drive mechanisms.

2. Relevant Background

Harmonic drives traditionally use an internal spur gear with an external gear that orbits eccentrically within it. Such drives generally provide high gear reduction ratios in a compact package. Such drives generally use meshing gear teeth. The axes of these gears do not coincide, but are slightly offset, and one axis orbits the other at a uniform radial distance. Such harmonic drives are positionable to desired locations, but typically use frictional inefficiencies between the gears to cause a "binding" to lock the mechanism at the finally adjusted position. Often, such devices may require special additional locking mechanisms to maintain the drive in its adjusted position.

Although harmonic drives have many applications, one example in which such drives are particularly useful is in adjustable seats of the type used in aircraft, or other vehicles. Typically such seats have a seat back that may be positionably, selectively rotated forward or backward from a rear portion of the bottom seat cushion, so that the user can adjust his degree of reclination. Also, often such seats have a headrest or head support that may be adjustably rotatable to conform to the users preference or body posture. Some seats also have lower back supporting portions that may be moved into or away from the back of the seat to conform to the small of the user's back. Such seat backs, head rests, and lower back supporting structures may be positioned by means of a rotatable or harmonic drive of the type described herein.

SUMMARY OF THE INVENTION

In light of the above, therefore, it is an object of the invention to provide an improved rotating drive mechanism or device.

It is another object of the invention to provide an improved harmonic drive mechanism.

It is another object of the invention to provide an improved rotating drive mechanism or device of the type described in which the drive cylinders are guided, floating, and cam driven.

It is another object of the invention to provide a rotating drive mechanism or device of the type described that provides an infinite position adjustment, which inherently locks in an adjusted position.

It is another object of the invention to provide a rotating drive mechanism or device of the type described that can be manufactured on conventional CNC lathes or mills, without requiring gear cutting machines, or the like.

These and other objects, features and advantages of the invention will become apparent to those skilled in the art from the following detailed description of the invention, when read in conjunction with the accompanying drawings and appended claims.

In accordance with a broad aspect of the invention, a device for rotating a first structure relative to a second structure is presented. The device includes first, second, and third coaxially disposed, floating cylinders. A cam is rotatably carried on the third cylinder, and bearings are held between the first and second cylinders for selectively engaging regions of the first and second cylinders and a face of the cam. The bearings force rotational movement between the first and second cylinders when the cam is rotated, and resist rotational movement between the first and second cylinders when a rotational force is applied between the first and second cylinders.

More particularly, and in accordance with another broad aspect of the invention, a device for rotating a first structure relative to a second structure is presented. The device includes a rotatable shaft for attachment to the first structure. A first cylinder is coaxially attached to the rotatable shaft, and has a plurality of bearing constraining apertures in which a plurality of bearings float. A hollow fixed member for attachment to the second structure coaxially carries the rotatable shaft, and has a coaxially attached second cylinder, disposed outside of the first cylinder. The second cylinder has a plurality of bearing seats on an inside wall thereof for selectively receiving the bearings. The second cylinder has a different number of the bearing constraining apertures than the number of bearing seats, so that the bearings are aligned by the constraining apertures to be movable to within the bearing seats only at selected locations.

A handle is coaxially and rotatably mounted to the fixed member, and carries a cam having a protruding cam face in one location that sequentially engages the bearings to urge the engaged bearings into respective ones of the bearing seats. The cam also has a recessed cam face in another location that allows the bearings to move laterally with movement of the first cylinder without engaging the bearing seats. When the handle is rotated with respect to the second cylinder, the bearings engaged by the cam are forced by the cam within the bearing constraining apertures of the first cylinder into the bearing seats of the second cylinder to move the first and second cylinders relative to each other.

According to yet another broad aspect of the invention, an harmonic drive is presented. The harmonic drive has a first cylinder, which may be attached to a first structure, and has a second cylinder coaxially attached to one of its ends. The second cylinder has a plurality of bearing constraining apertures extending through it in which a number of bearings are floatably carried. A third cylinder coaxially contains the first cylinder, and may be attached to a second structure for selective rotation with respect to the first structure. A fourth cylinder is coaxially attached to an end of the third cylinder, surrounding the second cylinder. The fourth cylinder has a plurality of bearing seats on its inside wall to selectively receive the bearings, which are aligned by the constraining apertures to be movable to within selected bearing seats. A fifth cylinder is coaxially and rotatably mounted to the third and fourth cylinders to serve as a handle. A cam is carried by the handle within the second and fourth cylinders. The cam has a cam face that sequentially engages the bearings to urge them into respective bearing seats with which they are aligned to move the first and third cylinders relative to each other.

BRIEF DESCRIPTION OF THE DRAWINGS

The invention is illustrated in the accompanying drawings, in which.

In the various views of the drawing, like reference numerals are used to denote like or similar parts.

DETAILED DESCRIPTION OF THE PREFERRED EMBODIMENTS

Figure 1:
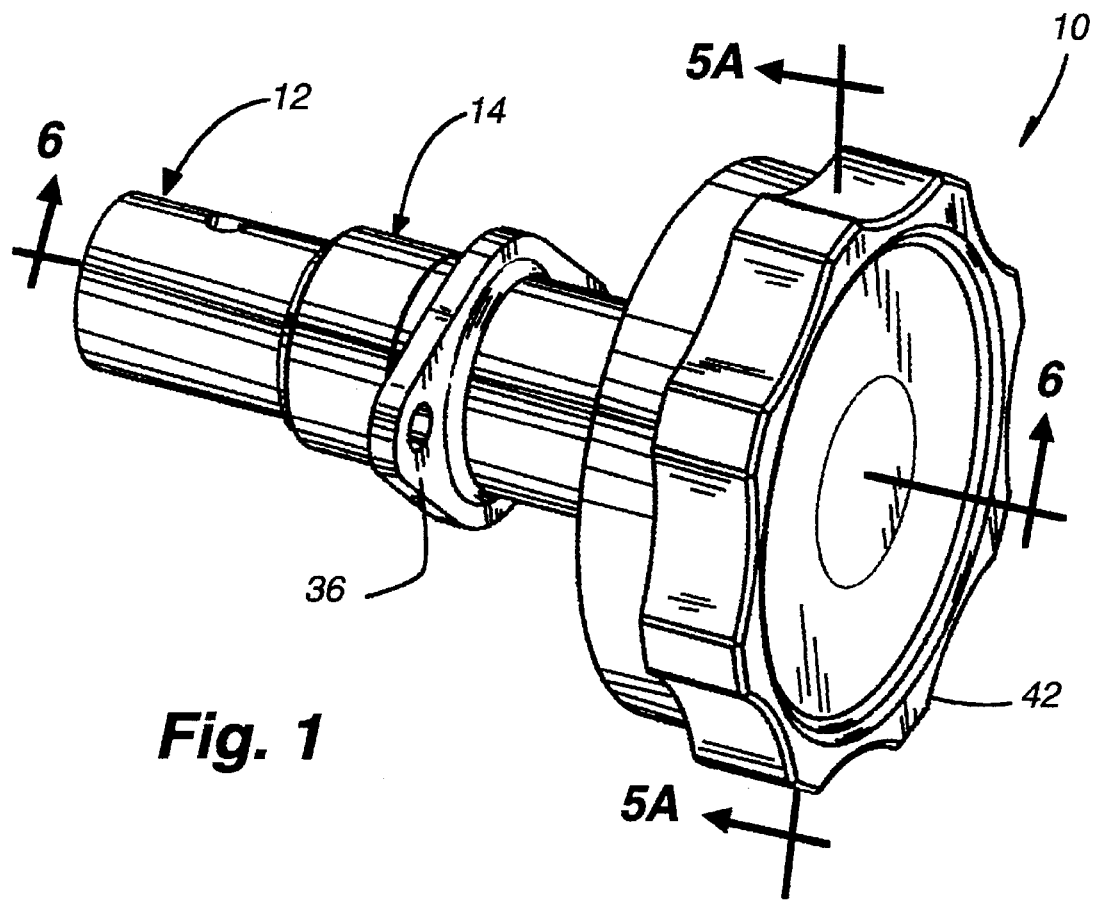
FIG. 1 is a perspective view showing an assembled harmonic drive assembly, in accordance with a preferred embodiment of the invention.

In general, according to a preferred embodiment of the invention, with reference now to the figures of the drawing, an harmonic drive assembly 10 is presented. The drive assembly 10 has four elements with coincident or coaxial axes. Two cylinders 12 and 14 provide, respectively, a rotating element to provide a power output, and a mounting interface. A power input cam 16 (best seen in FIGS. 3 and 5) drives multiple cylindrical rollers 18 radially outward. Although the cylinder 12 is described herein as the drive or output and the cylinder 14 is described as the fixed or mounting interface, the cylinders 12 and 14 can be either the output or mounting interface, as desired.

More particularly, the first cylinder 12 provides a rotatable shaft 26 for attachment to a first structure, such as a rotatable headrest mechanism of a seat for a vehicle. The shaft 26 may be a hollow cylinder, as shown, or may be a solid member, if desired. A bearing member 28 encircles the portion of the shaft 26 that will be carried within the hollow fixed member 14 to provide a bearing surface therebetween.

A cylinder 32 is coaxially attached to an end of the rotatable shaft 26. The cylinder 32 has a plurality of bearing constraining apertures 20 through its walls in which the bearings 18 float, in a manner below described in detail. The cylinder 32 may be of any convenient size, and is shown in the drawings as being sized with a larger diameter than the diameter of the shaft 26. It may be appreciated, however, that the cylinder 32 may be sized smaller than the shaft 26 (with appropriate adjustment in the sizes of the parts that interface with it), or may be merely an extension of the cylinder forming the shaft 26.

The apertures 20 in the wall of the cylinder 32 are generally rectangular in shape, and provide walls 34 against which the bearings 18 may bear to produce relative rotational movement between the shaft 26 and the fixed member 14, in a manner below described. It should be noted also that the shape of the apertures 20, although illustrated as being rectangular, may be changed as necessary to accommodate different shaped bearings, the bearings 18 shown being cylindrically configured. Also, the number of apertures 20 may be selected to provide harmonic alignment with the bearing seats 22 to enable progressive engagement between the bearings, bearing seats, and cam 16. In the embodiment shown, for example, 14 apertures and bearings are provided to progressively align with 15 bearing seats 22 during rotation of the cam 16.

The ratio of input turns to output turns is dependent upon the number of rollers 18 and their respective guide windows 20, compared to the number of guide seats 22 in the outermost cylinder 14. Thus, for example, if 14 rollers 18 are provided, and 15 guide seats 22 are provided, a 15:1 ratio results. Therefore, each full turn of the cam forces a wave of advancing engagement of rollers 18 into the guide seats 22 to reposition the cylinder 12$\frac{1}{15}$ of a turn.

The hollow fixed member 14 which coaxially contains the shaft 26 has a flange 36 for attachment to a stationary portion of the structure to be rotated. For example, if the device 10 is used to rotatably position a headrest of a seat, as above described, the flange 36 may be attached to a stationary seat portion to enable relative rotational movement between the headrest and seat back.

Another cylinder 38 is coaxially attached to an end of the fixed member 14 to be disposed outside of the first cylinder 32, as shown. A plurality of bearing seats 22 are provided on an inside wall 40 of the cylinder 38 for selectively receiving the bearings 18. As mentioned, the number of bearing seats 22 may be different from the number of the bearing constraining apertures 20 so that the bearings 18 are aligned by the constraining apertures to be movable to within the bearing seats only at selected locations to rotatably drive the shaft 26 within the fixed member 14. Thus, as mentioned, the plurality of bearing seats and the plurality of bearing constraining apertures are radially spaced harmonically with respect to each other. Also, the size of the cylinder 38 may be adjusted as desired, depending upon the size of the cylinder 32 and the mechanical advantage desired in the final assembly. However, since the cam 16, bearing constraining apertures 20, and bearing seats 22 contain the bearings, the space between the cylinders 32 and 38 should be relatively close.

A handle 42 is coaxially and rotatably mounted to the fixed member 14, and, more particularly, in the embodiment illustrated, surrounding the cylinder 38. A bearing surface 39 promotes rotation between the handle 42 and the cylindrical member 12. The handle 42 may have a cylindrical portion 44 that is coaxially aligned with and encircling the cylinder 38 of the fixed member 14. In such design, a circlip or keeper ring (not shown) may be provided in a groove in the interior of the cylinder 38 to maintain the axial position of the handle 42 with respect to the lip or ridge 46 provided on the cylinder 38, or, as shown, a bolt 43 may be used to rotatably secure the handle 42 to the assembly.

Figure 3:
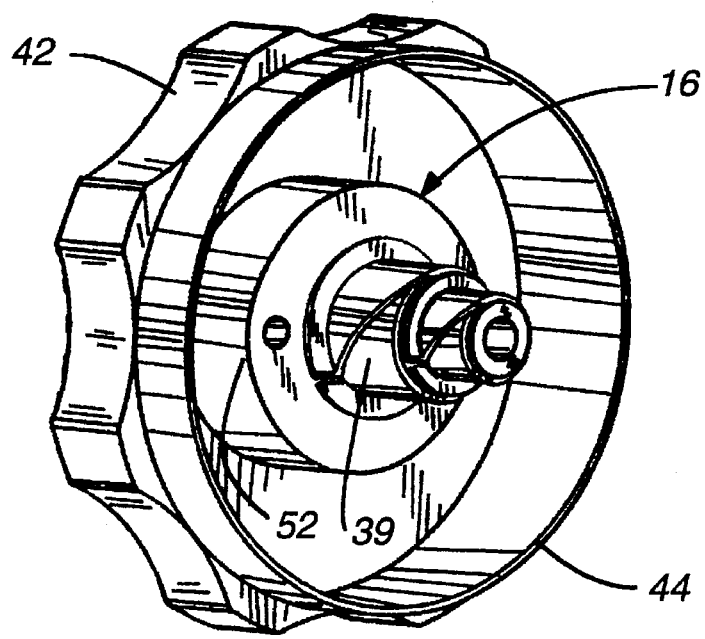
FIG. 3 is a perspective view of a front side of the handle assembly, showing the cam arrangement thereof, for use in the harmonic drive assembly of FIG. 1.
Figure 2:
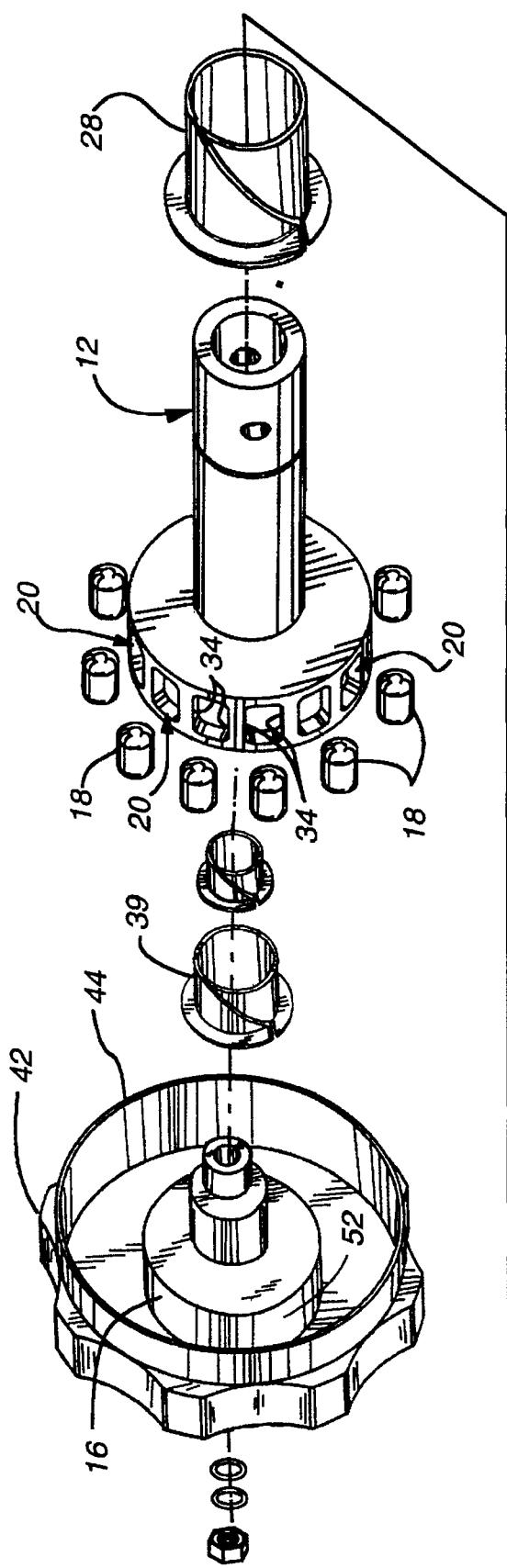
FIG. 2 is an exploded perspective view of the harmonic drive assembly of FIG. 1.
Figure 2:
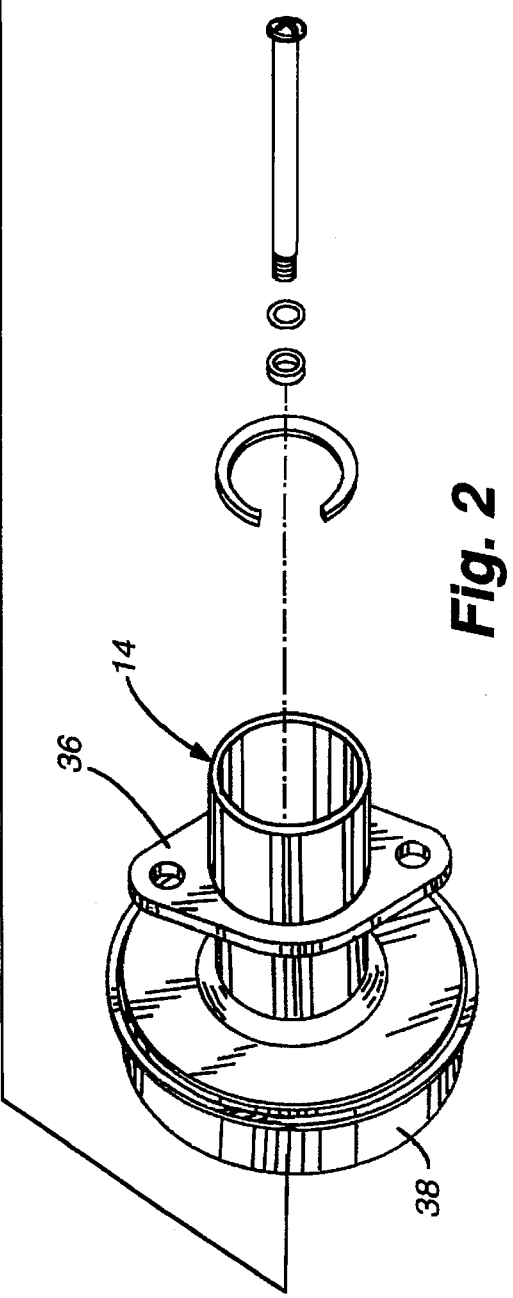
Figure 4:
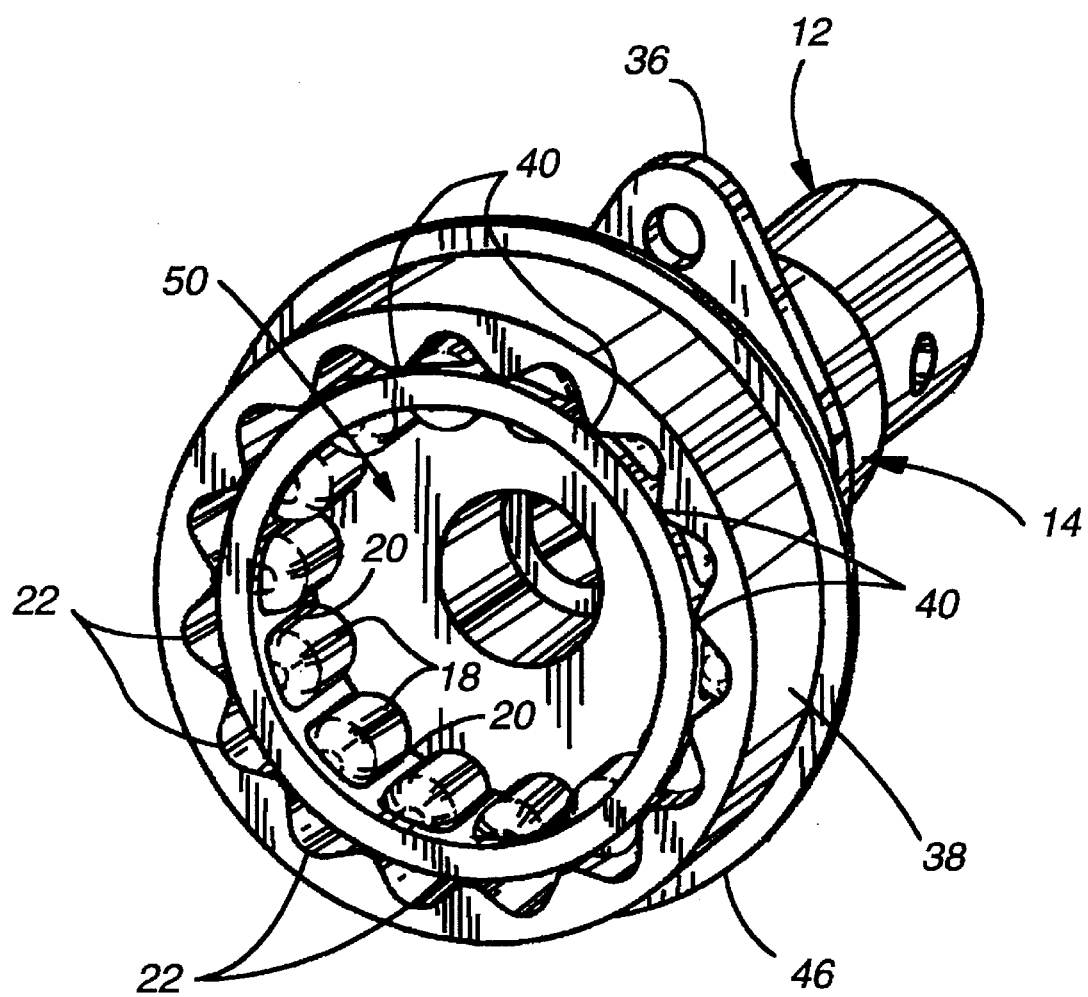
FIG. 4 is a rear perspective view of a partially assembled harmonic drive assembly of FIG. 1, with the handle assembly of FIG. 3 removed, showing the relationship of the interior bearings, bearing constraining apertures, and bearing seats.
Figure 5A:
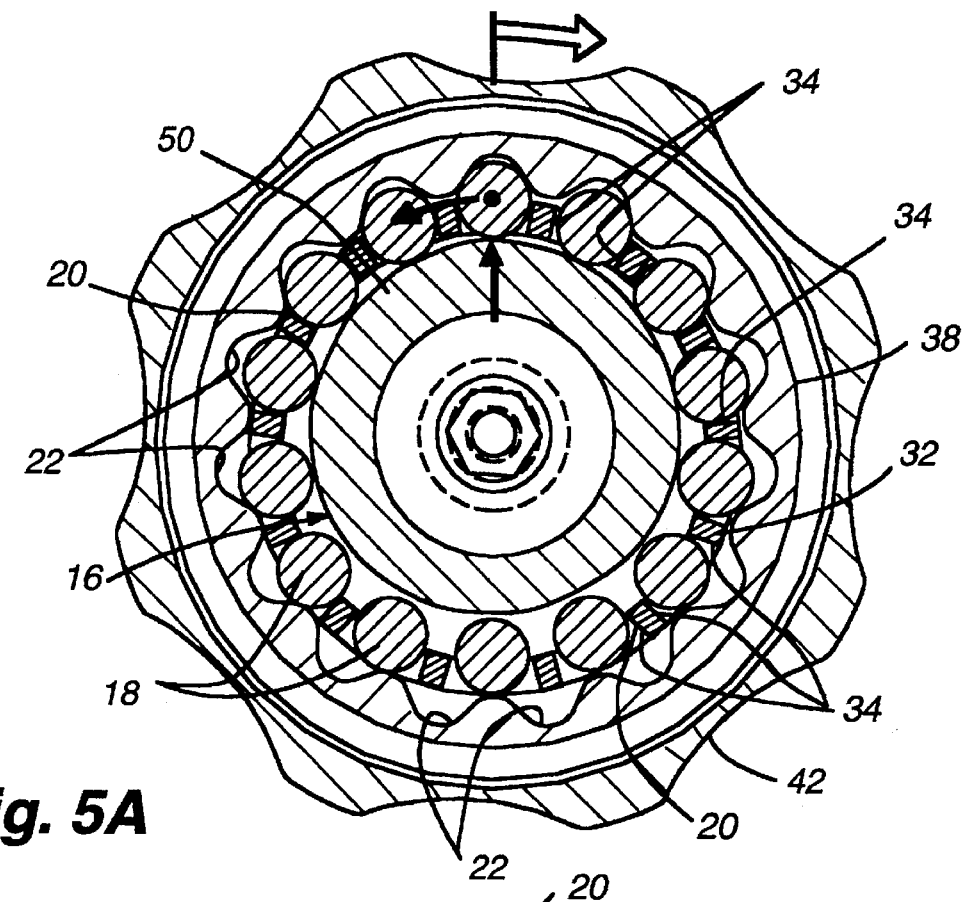
FIGS. 5A and 5B are cross-sectional plan views, taken at 5—5 in FIG. 1, showing the relationship of the driving cam, interior bearings, bearing constraining apertures, and bearing seats as the cam is rotated.
Figure 5B:
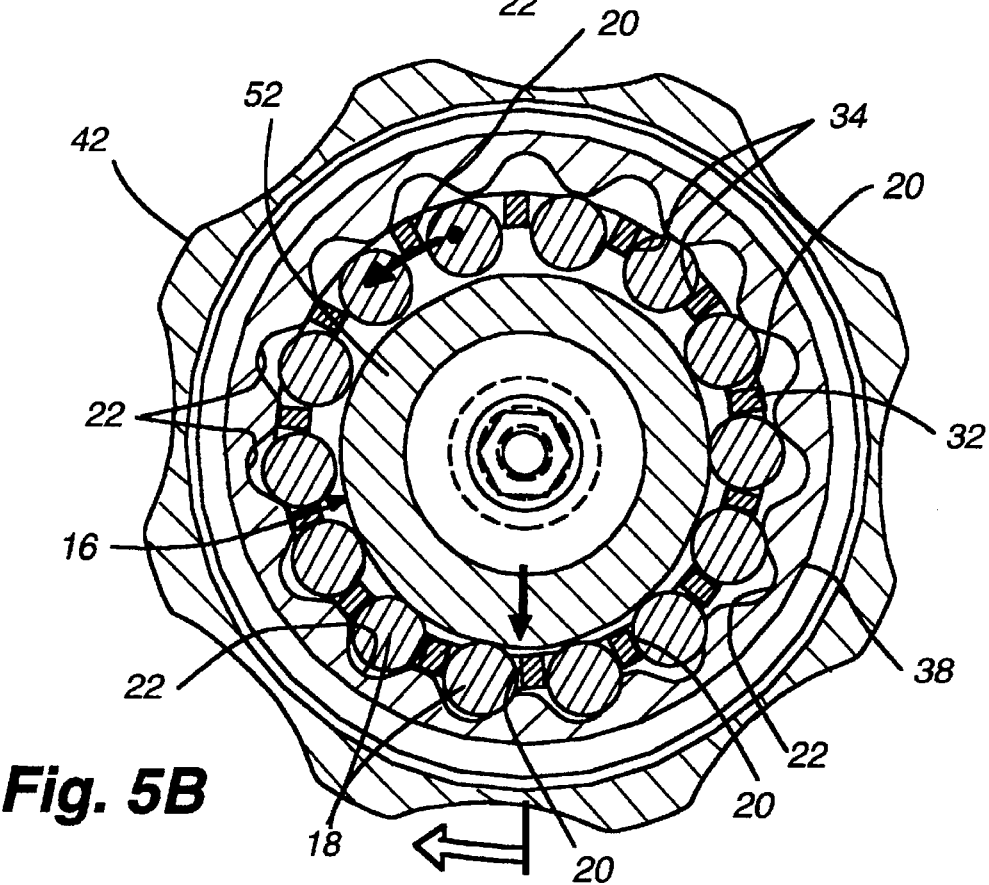
Figure 6:
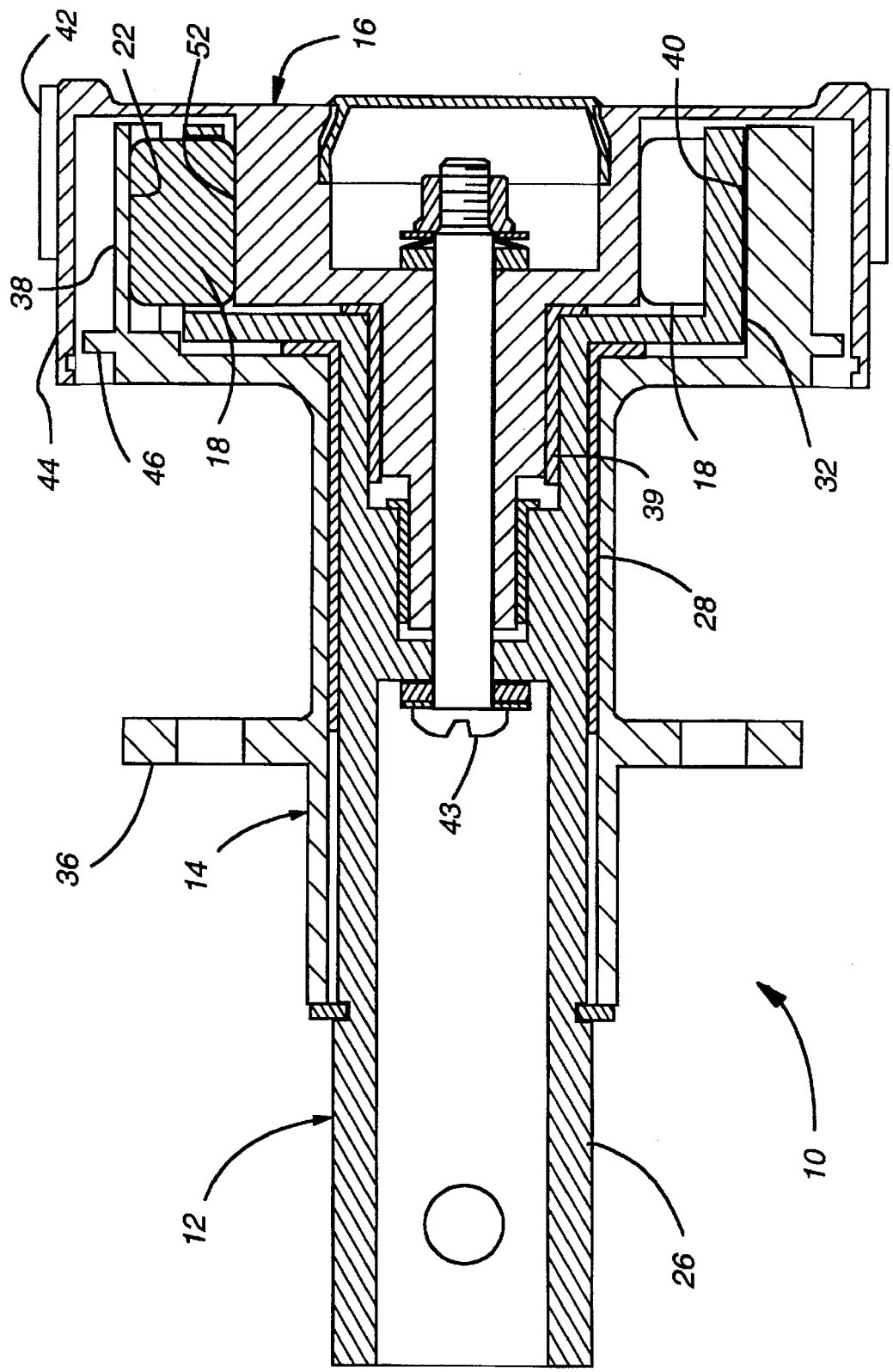
FIG. 6 is a side cross sectional view of an assembled harmonic drive assembly, in accordance with a preferred embodiment of the invention, taken at 6—6 in FIG. 1.

As best seen in FIG. 3, the handle 42 carries the cam 16 in its interior, so that when the handle 42 is mounted on the cylinder 38 of the fixed member 14, the cam is located within the space 50 within the cylinders 32 and 38. The cam 16 is shown having a single cam lobe 52 to sequentially engage successive bearings 18 as the cam 16 is rotated within the interior 50 of the cylinders 32 and 38. It should be noted, however, that the cam 16 may be multi-lobed, with appropriate adjustment of the numbers of respective bearings, bearing constraining apertures 20 and bearing seats 22. As best seen in FIGS. 5A and 5B, the cam 16 is sized so that when the cam lobe 52 engages the bearings 18 during rotation of the cam 18, it forces the engaged bearings into the bearing seats 22. On the other hand, the back side of the cam 16 is sized to allow the bearings 18 to move laterally with movement of the cylinder 32 without engaging the bearing seats 22 on the back side of the cam.

With reference again to FIGS. 5A and 5B, it can be seen that when the handle 42 is rotated with respect to the cylinder 38, the bearings 18 are sequentially engaged by the cam 16 and forced within the bearing constraining apertures 20 of the cylinder 32 into progressive ones of the bearing seats 22 of the cylinder 38. To promote relative movement between the cylinders 32 and 38 when the bearings are forced thereinto, the bearing seats 22 have inclined surfaces or walls. The bearing seats 22 may, for instance, have a generally "V" shape, with the "V" having an inside angle, for example, of about 80 degrees.

The bearings 18 bear upon the walls 34 of the bearing constraining apertures 20 to thereby move the first and second cylinders relative to each other. On the other hand, if a rotational force is applied between the shaft 26 and fixed member 14, the bearings 18 are jammed between the walls of the bearing seats 22, the walls 34 of the bearing constraining apertures 20, and the faces of the cam 16 to lock the apparatus. Thus, in the vehicle seat example above, the rotational position of the shaft 26, and therefore the headrest of the seat, can be desired to virtually any rotational position with respect to the fixed member 14 attached to the seat merely by rotating the handle 42. If, however, the headrest itself is attempted to be rotated, the shaft 26 will attempt to rotate within the fixed member 14, but will automatically lock.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A device for rotating a first structure relative to a second structure, comprising:

first, second, and third cylinders, said first cylinder being coaxially located within said second cylinder, and said second cylinder being coaxially located within said third cylinder;

a cam rotatably carried by said third cylinder to extend within said first cylinder; and bearings held between said first and second cylinders for selectively engaging regions of said first and second cylinders and a face of said cam for forcing rotational movement between said first and second cylinders when said cam is rotated, and for resisting rotational movement between said first and second cylinders when a rotational force is applied between said first and second cylinders.

2. The device of claim 1 wherein said regions for selective bearing engagement are bearing seat faces within bearing seats in said second cylinder and bearing constraining slot walls defining bearing constraining slots in said first cylinder.

3. The device of claim 2 wherein said bearings are arranged in some of said bearing seats to resist relative rotational movement between said first and second cylinders when rotational force is applied therebetween.

4. The device of claim 2 wherein said bearings are cylindrically shaped, and are carried within said bearing constraining slot walls through said second cylinder.

5. The device of claim 2 wherein said cam sequentially forces said bearings against progressive ones of said bearing seat faces in said second cylinder when a rotational force is applied between said second and third cylinders.

6. The device of claim 5 wherein said bearing seats are "V" shaped.

7. The device of claim 6 wherein said "V" shape has an angle of about 80 degrees.

8. The device of claim 2 wherein said plurality of bearing seats and said plurality of bearing constraining slot walls are radially spaced harmonically with respect to each other.

9. The device of claim 2 wherein said bearing seats are 15 in number and said bearing constraining slots are 14 in number.

10. A device for rotating a first structure relative to a second structure, comprising:

a rotatable shaft for attachment to said first structure;

a plurality of bearings;

a first cylinder coaxially attached to said rotatable shaft, said first cylinder having a plurality of bearing constraining apertures in which said bearings float;

a hollow fixed member for attachment to said second structure, coaxially containing said rotatable shaft;

a second cylinder coaxially attached to said fixed member and disposed outside of said first cylinder, said second cylinder having a plurality of bearing seats on an inside wall thereof for selectively receiving said bearings, the number of said bearing constraining apertures being different from the number of said bearing seats, wherein said bearings are aligned by said constraining apertures to be movable to within said bearing seats only at selected locations;

a handle coaxially and rotatably mounted to said fixed member;

a cam carried by said handle within said first cylinder, having a cam face in one direction that sequentially engages said bearings to urge said engaged bearings into said bearing seats, and having a recessed portion in another direction that allows said bearings to move laterally with movement of said first cylinder without engaging said bearing seats;

whereby when said handle is rotated with respect to said second cylinder, said bearings are sequentially engaged by said cam and forced within said bearing constraining apertures of said first cylinder into progressive ones of said bearing seats of said second cylinder to move said first and second cylinders relative to each other.

11. The device of claim 10 wherein said bearing seats have an inclined surface to promote relative movement between said first and second cylinders when said bearings are forced thereinto.

12. The device of claim 11 wherein said bearing seats are generally "V" shaped.

13. The device of claim 12 wherein said "V" shape has an angle of about 80 degrees.

14. The device of claim 10 wherein said bearings are cylindrically shaped.

15. The device of claim 10 wherein said bearings are arranged in at least some of said bearing seats to resist relative rotational movement between said first and second cylinders when rotational force is applied between said first and second cylinders.

16. The device of claim 10 wherein said plurality of bearing seats and said plurality of bearing constraining apertures are radially spaced harmonically with respect to each other.

17. The device of claim 10 wherein said plurality of bearing seats are 15 in number and said plurality of bearing constraining apertures are 14 in number.

18. An harmonic drive, comprising:

a first cylinder for attachment to a first structure;

a plurality of bearings;

a second cylinder coaxially attached to an end of said first cylinder, said second cylinder having a plurality of bearing constraining apertures extending through said second cylinder in which said bearings are floatably carried;

a third cylinder coaxially containing said first cylinder for attachment to a second structure to be selectively rotated with respect to said first structure;

a fourth cylinder coaxially attached to an end of said third cylinder, and surrounding said second cylinder, said fourth cylinder having a plurality of bearing seats on an inside wall for selectively receiving said bearings, said bearings being aligned by said constraining apertures to be movable to within selected ones of said bearing seats;

a fifth cylinder coaxially and rotatably mounted to said third and fourth cylinders;

a cam carried by said fifth cylinder rotatably within said second and fourth cylinders, having a cam face that sequentially engages said bearings when said fifth cylinder is rotated to force said engaged bearings into progressive bearing seats to move said first and third cylinders relative to each other.

19. The device of claim 18 wherein said plurality of bearing seats and said plurality of bearing constraining apertures are radially spaced harmonically with respect to each other.

20. The harmonic drive of claim 18 wherein the number of said bearing constraining apertures is different from the number of said bearing seats.

21. The harmonic drive of claim 18 wherein said bearing seats have an inclined surface to promote relative movement between said first and third cylinders when said bearings are forced thereinto.

22. The harmonic drive of claim 21 wherein said bearing seats are generally "V" shaped.

23. The harmonic drive of claim 22 wherein said "V" shape has an angle of about 80 degrees.

24. The harmonic drive of claim 18 wherein said bearings are cylindrically shaped.

25. The harmonic drive of claim 18 wherein said bearings are arranged in at least some of said bearing seats to resist relative rotational movement between said first and third cylinders when rotational force is applied between said first and third cylinders.

26. The harmonic drive of claim 18 wherein said plurality of bearing seats are 15 in number and said plurality of bearing constraining apertures are 14 in number.

* * * * *